United States Patent [19]

Larsen et al.

[11] 4,017,447
[45] Apr. 12, 1977

[54] FLOW CONTROL AGENT FOR ULTRA THIN EPOXY RESIN POWDER COATINGS

[75] Inventors: Donald Wayne Larsen, Marriottsville; Jerrold Bain Billmyer, Sykesville, both of Md.

[73] Assignee: W. R. Grace & Co., New York, N.Y.

[22] Filed: Sept. 8, 1975

[21] Appl. No.: 611,019

[52] U.S. Cl. .......................... 260/31.2 R; 260/836; 260/837 R; 427/27; 428/413; 428/463
[51] Int. Cl.$^2$ .......................................... C08K 5/10
[58] Field of Search .............................. 260/31.2 R

[56] References Cited

UNITED STATES PATENTS 3,105,826  10/1963  Jaggard ...................... 260/31.2 R Primary Examiner—Harry Wong, Jr.
Attorney, Agent, or Firm—Richard P. Plunkett; Kenneth E. Prince

[57] ABSTRACT

A thermosetting resin composition consisting essentially of a solid epoxy resin having a molecular weight in the range 1,000–4,000, 1–15% by weight of the epoxy resin of a curing agent therefor and 0.5 to 3.0% by weight of the composition of a flow control agent consisting essentially of liquid poly(ethyl acrylate) having a number average molecular weight in the range 5,000 to 15,000. The composition when melt compounded and milled to an average particle size diameter of 2–20 microns can be electrostatically deposited onto metallic surfaces such as can interiors to produce an ultra thin (0.3–1.0 mil thick) protective coating on curing.

2 Claims, No Drawings

FLOW CONTROL AGENT FOR ULTRA THIN EPOXY RESIN POWDER COATINGS

This invention relates to a synthetic resin coating composition. More particularly to a composition which is to be applied to metallic parts to produce thereon an ultra-thin protective coating free of pinholes.

Since the event of the Clean Air Act of 1970 internal can and drum lacquers made with a 100% organic solvent have been curtailed immeasurably. Even water dilutable organic solvents are not finding commercial acceptability due to the fact that incinerators are still required to burn off the organic solvents. Such a course is prohibitive due to the cost of natural gas in most cases. Systems using an all water vehicle for the can lacquer are also experiencing unacceptability due to the fact that it is difficult to wet the metals and the large amount of energy required to evaporate the water in the short period of time that the can is on the line. Present day coating technology, due to the aforesaid drawbacks, is more and more going to powder coatings.

Many synthetic resinous products such as acrylate polymers exhibit properties which make them potentially useful as surface coating compositions. However, such compositions have the drawback that films prepared from same are quite brittle and lack the distensibility that most coatings require. Additionally, acrylate polymers have limited adhesion to metal surfaces.

Epoxy resins are also used for surface coating compositions. However, epoxy resins have the drawback that they do not flow uniformly and readily on heating thereby curtailing production within a specified time limit. Poor flow characteristics assures the presence of pinholes in the resin coating, thereby permitting corrosion thereat which once started can spread over the surface underneath the coated layer. Such corrosion has a deleterious effect on the taste of the beverage in the can and can even result in contamination of the contents of the can. Various compositions have been set forth to overcome these drawbacks. One composition is that set out in U.S. Pat. No. 3,058,951 wherein a totally solid composition of an epoxy resin, a polyvinyl-acetal resin and a polyacrylate resin is compounded to form a synthetic resin-coated composition. Such a composition although operable to form coatings from solvent solution cannot be used to form the ultra-thin invention coatings, e.g., 0.3–1.0 mil thick of the instant invention by the electrostatic deposition method. This is due to the fact that the polyacrylate resin is present in too high a percent to allow good adhesion of the epoxy to the metal substrate and also results in the coating being oily.

One object of the instant invention is to provide a novel composition of matter which is especially suitable as an ultra-thin protective coating for metallic parts and which avoids the above disadvantages of known coating compositions. Another object of this invention is to provide a coating composition of the aforesaid type which is imminently suitable for use in coating metallic articles by electrostatic deposition of a powder.

These and other objects, as will be shown hereinafter, are accomplished by a comminuted thermosetting resin composition comprising a solid epoxy resin having a molecular weight in the range 1,000–4,000, 1–15% weight of the epoxy resin of a curing agent therefor and 0.5–3.0% by weight of the composition of a flow-control agent consisting essentially of liquid poly(ethyl acrylate) having a number average molecular weight in the range 5,000 to 15,000 and a viscosity at 50° C of 20,000 to 100,000 cps, the particles in said composition having an average diameter of 2–20 microns. The composition when melt-compounded and milled to an average particle size diameter of 2–20 microns can be electrostatically sprayed onto metal surfaces such as can interiors to produce an ultra-thin (0.3–1.0 mil thick) protective coating on curing.

The solid epoxy resins operable herein have a molecular weight in the range 500–12,000, preferably 1,000–4,000 are known as epoxide or ethoxyline resins and are the reaction product of a phenol having at least two phenolic hydroxy groups and an epihalogenohydrin, e.g., epichlorohydrin, in which the said reaction product contains at least two ethylene oxide groups. Commercially available epoxy resins operable herein are described in the Handbook of Epoxy Resins, H. Lee and K. Neville, 1967, McGraw-Hill Inc., in Appendix 4—2, incorporated herein by reference.

The epoxy resins are generally defined as complex epoxide resins comprising a polyether derivative of a polyhydric organic compound containing epoxy groups, the best known being the reaction product of epichlorohydrin and a diphenol, i.e., bis-(4-hydroxyphenyl)-2,2-propane. These complex resins contain epoxide groups or epoxide and hydroxyl groups as their functional groups and are generally free from other functional groups such as basic and acidic groups. As is well known, it is necessary to react these epoxy resins with a hardener or catalyst to cure them to a solid useful state. Such hardeners and catalysts are well known to those skilled in the art and include, but are not limited to Lewis bases, inorganic bases, primary and secondary amines, amides, carboxylic acid anhydrides, dibasic organic acids, phenols, and Lewis acids. The hardeners and catalysts may be used in combination if desired as is well known to one skilled in the art. Various well known accelerators can be added to speed up the reactions of the curing agents.

The catalysts and hardeners, either per se or combined, are usually added to the composition in an amount ranging from 1 to 15% by weight of the epoxy resin. Trimellitic anhydride has been found particularly satisfactory as an epoxy resin hardener in the compositions herein. However, other known curing agents may be used for this purpose such as other anhydrides, e.g., maleic anhydride, chlorendic anhydride and pyromellitic dianhydride; amine types of epoxy curing agents, e.g., ethylene diamine, diethylene triamine, dicyandiamide, piperidine and the like and such catalysts as boron trifluoride amine complexes.

In practicing the instant invention it is critical that the liquid poly(ethyl acrylate) flow control agent has a viscosity in the range 20,000–100,000 cps at 50° C. Liquid poly(ethyl acrylates) exhibiting these viscosities have number average molecular weights in the range 5,000—15,000. Otherwise, proper flow will not be obtained and the coating will have pinholes or will be uneven. Although mechanism of spreading and leveling of powder coatings is not understood completely, it is thought that effective flow modifiers have a borderline compatibility with the coating resin. A completely soluble agent such as a poly(ethyl acrylate) with excessive molecular weight would not exude to the particle surface and could have little effect on the surface tension of the molten resin. On the other hand, an agent with too little solubility in the coating resin, such as poly-(ethyl acrylate) with insufficient molecular weight will exude completely, precoating the metal surface and inhibiting the spread of the molten resin. If compatibility of the flow control agent with the coating resin is borderline, as are the resins of the present invention, the agent will concentrate at the surface of the powder particles, lowering the surface tension and promoting the spreading of the coating resin over the metal surface and causing the particles to coalesce before they cure.

The poly(ethyl acrylate) can be formed by well known existing processes. The best method of preparing low molecular weight polymer is to polymerize a dilute solution of monomer. This is easily done by feeding separate streams of ethylacrylate monomer and 1–2% of a free radical catalyst, e.g., benzoyl peroxide, based on the weight of the monomer, to a reaction vessel containing preheated solvent, e.g., toluene at 195° to 230° F. After the monomer and catalyst are charged, the temperature is maintained until the reaction is complete. The solvent is removed from the product.

The thermosetting epoxy resin composition herein is formed into the required particle size for electrostatic deposition by standard well known processes. That is, the liquid poly(ethyl acrylate) and the epoxy resin along with the hardener and catalyst are charged to a wet-dry powder blender in order that the epoxy particles can be uniformly coated with the poly(ethyl acrylate) flow control agent. The thus blended material is passed through a hot melt extruder maintained at a temperature above the melting point of the epoxy resin but below that at which curing occurs wherein it is melt-blended. After exiting the extruder the material is cooled and passed to a hammer mill from which it exits in the form of flakes of 6 to 8 mesh size. This material is then blended with silica, e.g., about 1 to 3% based on the weight of the composition. The silica (1–2 micron average diameter) is added to avoid caking and to obtain optimum bulk flow of the particles up to the time they are cured by heating. The thus blended composition is then ground to a fine powder by a suitable grinder, e.g., a jet or fluid energy mill, until particles of the epoxy resin composition have an average particle size diameter in the range 2 to 20 microns.

The coatings of the epoxy resin composition herein were tested for commercial acceptability by means of a WACO Enamel Rater. This is an electrical conductivity test wherein the body of a two piece-can after being coated is nearly filled with a 1% solution of sodium chloride and grounded so that the can becomes one electrode in an electrical circuit. A second electrode is inserted into the salt solution and sufficient voltage is applied so that a current of 20 milliamps could be passed through an unlacquered can. The amount of current passing through the coating is measured. A coating weighing 500 milligrams or less on the inside of the body of a two piece-12 oz. capacity can that passes not more than 10 milliamps current is commercially acceptable and is pinhole free. A superior coating will pass not more than 2 milliamps at a coating weight of 500 milligrams or less. A 500 milligram coating typically has a thickness of 0.8 mil.

A further test for the adhesion of the coating to the metal can substrate is carried out by immersing the coated can for 10 minutes in boiling water. The can is then dried and the surface of the coating is cut with a scalpel making a figure X. An adhesive tape is pressed over the X mark, then pulled off to test the degree of adhesion of the coating of the steel. If no coating is removed, adhesion is excellent.

The following examples are set out to explain but expressly do not limit the instant invention. Unless otherwise noted, all parts and percentages are by weight.

EXAMPLE 1

PREPARATION OF LIQUID POLY(ETHYL ACRYLATE)

To a 25 gallon Patterson-Kelly jacketed reactor equipped with stirrer was charged 115 pounds toluene and the reactor was heated in the range 195°–225° F. To the heated reactor 14.3 pounds of ethylacrylate stabilized with 15–50 ppm of the monomethyl ether of hydroquinone was added in two hours. Simultaneously, another stream consisting of a solution of 130 grams of benzoyl peroxide in 13 pounds of toluene was added to the reactor over a four hour-period. For safety, benzoyl peroxide wet with water is used to prepare this solution. The peroxide stream was added more slowly in order to maintain the peroxide concentration after all the ethylacrylate had been added. After the addition to the reactants the reactor was maintained at a temperature in the range 195°–225° F for twenty minutes with stirring while the reaction was completed. The toluene solvent was removed under reduced pressure (15–20 inches) until the poly(ethyl acrylate) concentration increased from 10% to 50–60%. The resulting two gallons of concentrate was filtered and concentrated to 100% in a laboratory rotary evaporator. The resulting liquid poly(ethyl acrylate) product had a number average molecular weight of 8,100 calculated from gel permeation chromotography, a viscosity of 28,000 cps at 50° C and weighed 10.4 pounds.

EXAMPLE 2

A powder of an epoxy resin composition was prepared from the following formulation:

| Component | Weight Percent |
|---|---|
| Epoxy Resin A - a commercially available epoxy resin having an epoxide equivalent weight of 730–840, a softening point 88–98° C, a specific gravity of 1.19 and a molecular weight range of 1,460–1,680 | 56.7 |
| Epoxy Resin B - a commercially available epoxy resin having an epoxide equivalent weight of 750, a softening point 88–90° C, a specific gravity of 1.19 and a molecular weight of 1,500 | 30.8 |
| Trimellitic anhydride (hardener) | 10.1 |
| Dicyandiamide (accelerator) | 0.8 |

-continued

| Component | Weight Percent |
| --- | --- |
| Poly(ethyl acrylate) from Example 1 | 1.6 |

The epoxy resin composition supra was charged to a Wellex wet-dry powder blender and blended therein until the epoxy and other particles were uniformly coated with the liquid poly(ethyl acrylate). The material was removed from the blender and charged to a hot melt extruder maintained at a temperature in the range 100°–210° C, i.e., above the melting point of the epoxy resin but below the temperature at which curing initiates whereby the materials were homogeneously melt-blended. On exiting the extruder, the material was cooled and passed through a hammer mill to produce a flake product of 6–8 mesh size. The material was then blended with 2% by weight of the epoxy resin composition of silica (1 micron average diameter) in a V-blender to insure that the composition does not cake and to obtain optimum bulk flow of the particles up to the time they are cured. The thus blended composition was then charged to a 12 inch-fluid energy mill wherein it was ground to an average particle diameter of 13 microns.

The powder was then deposited electrostatically onto the inside of the body of two piece-steel 12 ounce-capacity cans in amounts which varied from 150 to 700 milligrams. After deposition the thus coated cans were cured in an oven for 2 minutes at 400° F to form integral coatings on the inside of the cans.

The coatings were tested for electrical conductivity by means of a WACO Enamel Rater.

The can having a coating weighing 430 milligrams had a conductivity of less than 2 milliamps. The coating had excellent appearance, exhibiting high gloss and no pitting or uneveness. The coating had a thickness of 0.7 mil.

In a further test of the quality of the coating, the can was immersed for 10 minutes in boiling water. It was then dried and the surface of the coating was cut through with a scalpel making a figure X. An adhesive tape was pressed over the X mark, then pulled off to test the degree of adhesion of the coating to the steel. No coating was removed by the adhesive tape, thus showing good adhesion of the coating to the steel substrate.

EXAMPLE 3

A master batch of epoxy resin and poly(ethyl acrylate) was made up as follows. 760 pounds of Epoxy Resin B from Example 2 was blended with 40 pounds of liquid poly(ethyl acrylate) having a number average molecular weight of 8,100 and a viscosity of 28,000 centipoises at 50° C. The blend was charged to a Wellex wet-dry powder blender to homogeneously coat the solid epoxy with the liquid poly(ethyl acrylate). The material was then charged to a hot melt extruder maintained at 100°–120° C for more homogeneous blending. The material that exited the blender was cooled and then passed through a water-cooled jacketed hammer mill from which it exited in a form of flakes (6–8 mesh). This material will be referred to as master batch I herein.

EXAMPLE 4

A powder of the following thermosetting epoxy composition was formulated as follows:

| Component | Weight Percent |
| --- | --- |
| Master batch I from Example 3 | 32.3 |
| Epoxy Resin B from Example 2 | 56.7 |
| Trimellitic anhydride | 10.1 |
| Dicyandiamide | 0.8 |

The composition was charged to a Wellex wet-dry powder blender to homogeneously admix the powders. Thereafter, the homogeneously admixed powders were charged to a hot melt extruder maintained in the range of 100°–120° C wherein the powders were more homogeneously admixed in the melted epoxy resin. The material exiting the extruder was cooled and then charged to a hammer mill from which it exited in the form of flakes (6–8 mesh). The flakes were then blended in a V-blender with silica, (average particle diameter 1–2 microns) in an amount that the silica was 1% by weight of the composition. The thus blended material was then charged to a 12 inch-fluid energy mill and ground until the particles had an average particle size of 13 microns. The thus formed powder was then deposited electrostatically onto the inside of the body of two-piece steel 12 oz. capacity cans in amounts which varied from 150–700 milligrams. The thus coated cans were cured in an oven for 2 minutes at 400° F to form integral coatings on the inside of the cans. In testing for electrical conductivity by means of the WACO Enamel Rater, coatings of between 400 and 500 milligrams resulted in conductivities of less than 2 milliamps. The coatings (0.6–0.8 mil thick) exhibited high gloss and no pitting or uneveness.

EXAMPLE 5

The procedure of Example 4 was used except that the formulation of the powder was as follows:

| Component | Weight Percent |
| --- | --- |
| Epoxy Resin A from Example 2 | 81 |
| Master batch I from Example 3 | 8.1 |
| Trimellitic anhydride | 10.1 |
| Dicyandiamide | 0.8 |

The concentration of poly(ethyl acrylate) in the formulation that was added via master batch I was 0.4%. When the coating was tested on the WACO enamel tester, in order to obtain an electrical conductivity of less than 10 milliamps, coating weights of 600–700 milligrams (1.0–1.2 mil thick) were required because the powder did not flow and wet the metal readily. Even at the 600–700 milligram level, the coating was pitted and uneven. The coating did pass the adhesion test described herein.

EXAMPLE 6

Example 2 was repeated except that the percentage of poly(ethyl acrylate) was increased to 3.2% and the amount of Epoxy Resin B from Example 2 was decreased to 29.2 weight percent.

Using this composition, a coating weight of only 300–400 milligrams (0.5–0.7 mil thick) was required to obtain a coating having an electrical conductivity of less than 10 milliamps. However, the coating was oily and did not pass the adhesion test. The adhesive tape removed large portions of the lacquer from the steel substrate where it had been scored by the scalpel.

Examples 5 and 6 show the criticality of the concentration range of the poly(ethyl acrylate) leveling agent.

EXAMPLE 7

Using the procedure of Example 3, a second master batch of epoxy resin and poly(ethyl acrylate) was made up using the following components:

| Component | Weight Percent |
|---|---|
| Epoxy Resin B from Example 2 | 95 |
| Liquid poly(ethyl acrylate) having a number average molecular weight of 10,800 and a viscosity of 51,000 cps at 50° C | 5 |

This will be referred to herein as Master batch II.

EXAMPLE 8

Example 2 was repeated except that the formulation was as follows:

| Component | Weight Percent |
|---|---|
| Epoxy Resin A from Example 2 | 81 |
| Master batch II from Example 7 | 8.1 |
| Trimellitic anhydride | 10.1 |
| Tin octoate (accelerator) | 0.8 |

The concentration of poly(ethyl acrylate) in this formulation was 0.4%. At this low concentration of leveling agent, between 600 and 700 milligrams (1.0–1.2 mil thick) were required to obtain sufficiently low conductivity, i.e., 10 milliamps, to indicate complete coverage of the steel substrate. The coating was rough, pitted and otherwise exhibited very poor leveling. The coating did pass the adhesion test.

EXAMPLE 9

Example 8 was repeated except that the concentration of the poly(ethyl acrylate) was increased to 2.9% by using the following formulation:

| Component | Weight Percent |
|---|---|
| Epoxy Resin A from Example 2 | 31 |
| Master batch II | 58.3 |
| Trimellitic anhydride | 9.9 |
| Tin Octoate | 0.8 |

Using this powder formulation, an electrostatically applied coating weighing only 310 milligrams (0.5 mil thick) was all that was required to obtain a pinhole free coating having sufficiently low electrical conductivity, i.e., 10 milliamps, for commercial acceptance. The appearance of the coating was excellent and it passed the adhesion test.

EXAMPLE 10

Example 2 was repeated except that the poly(ethyl acrylate) had a number average molecular weight of 13,200 and a viscosity of 103,000 centipoises at 50° C.

The leveling action of this poly(ethyl acrylate) was marginal. The powder applied electrostatically to the body of a two-piece 12 oz. capacity beer can passed the 10 milliamps conductivity test with a coating weight in a range 300–400 milligrams (0.5–0.7 mil thick), but the appearance of the coating was poor, being dull and somewhat uneven. The material did pass the adhesion test.

EXAMPLE 11

The procedure of Example 2 was repeated with the following formulation:

| Component | Weight Percent |
|---|---|
| Epoxy Resin A from Example 2 | 88.2 |
| Trimellitic anhydride | 10.0 |
| Tin Octoate | 0.8 |
| Poly(ethyl acrylate) having a number average molecular weight of 10,800 and a viscosity of 51,000 centipoises at 50° C | 1.0 |

A pinhole free coating, (electrical conductivity < 10 milliamps) was attained at coating weights of 300–400 milligrams (0.5–0.7 mil thick). These coatings had excellent appearance and passed the adhesion test.

EXAMPLE 12

Example 11 was repeated with the following formulation:

| Component | Weight Percent |
|---|---|
| Epoxy Resin A from Example 2 | 86.4 |
| Trimellitic anhydride | 9.8 |
| Tin Octoate | 0.8 |
| Poly(ethyl acrylate) | 3.0 |

The results were essentially the same as in Example 11.

EXAMPLE 13

Example 11 was repeated except that the poly(ethyl acrylate) was a commercially available material that had a number average molecular weight of 36,700 and was glassy at room temperature.

This powder exhibited almost no leveling action and a suitable coating could not be made.

EXAMPLE 14

Example 12 was repeated except that the poly(ethyl acrylate) was a commercially available material having a number average molecular weight of 36,700 and was glassy at room temperature. The results were the same as in Example 13 in that this powder exhibited no-leveling action and a suitable coating could not be made. The results of these last two formulations in Examples 13 and 14 show the criticality of keeping the poly(ethyl acrylate) within Applicant's critical number average molecular weight range.

The coating compositions of the instant invention are operable to form coatings on various metal substrates including, but not limited to aluminum, steel, tin free steel, tin plate, black plate, copper and the like.

We claim:

1. A particulate thermosetting resin composition consisting essentially of a solid epoxy resin comprising a polyether derivative of a polyhydric organic compound containing epoxy groups and having a molecular weight in the range 1,000–4,000, 1–15% by weight of the epoxy resin of a curing agent therefor and 0.5–3.0% by weight of the composition of a flow control agent consisting essentially of liquid poly(ethylacrylate) having a number average molecular weight in the range 5,000–15,000, the particles of said composition having an average size diameter of 2–20 microns and said molecular weights herein being measured by gel permeation chromotography.

2. The fused product of the composition of claim 1.

* * * * *